United States Patent Office 2,867,024
Patented Jan. 6, 1959

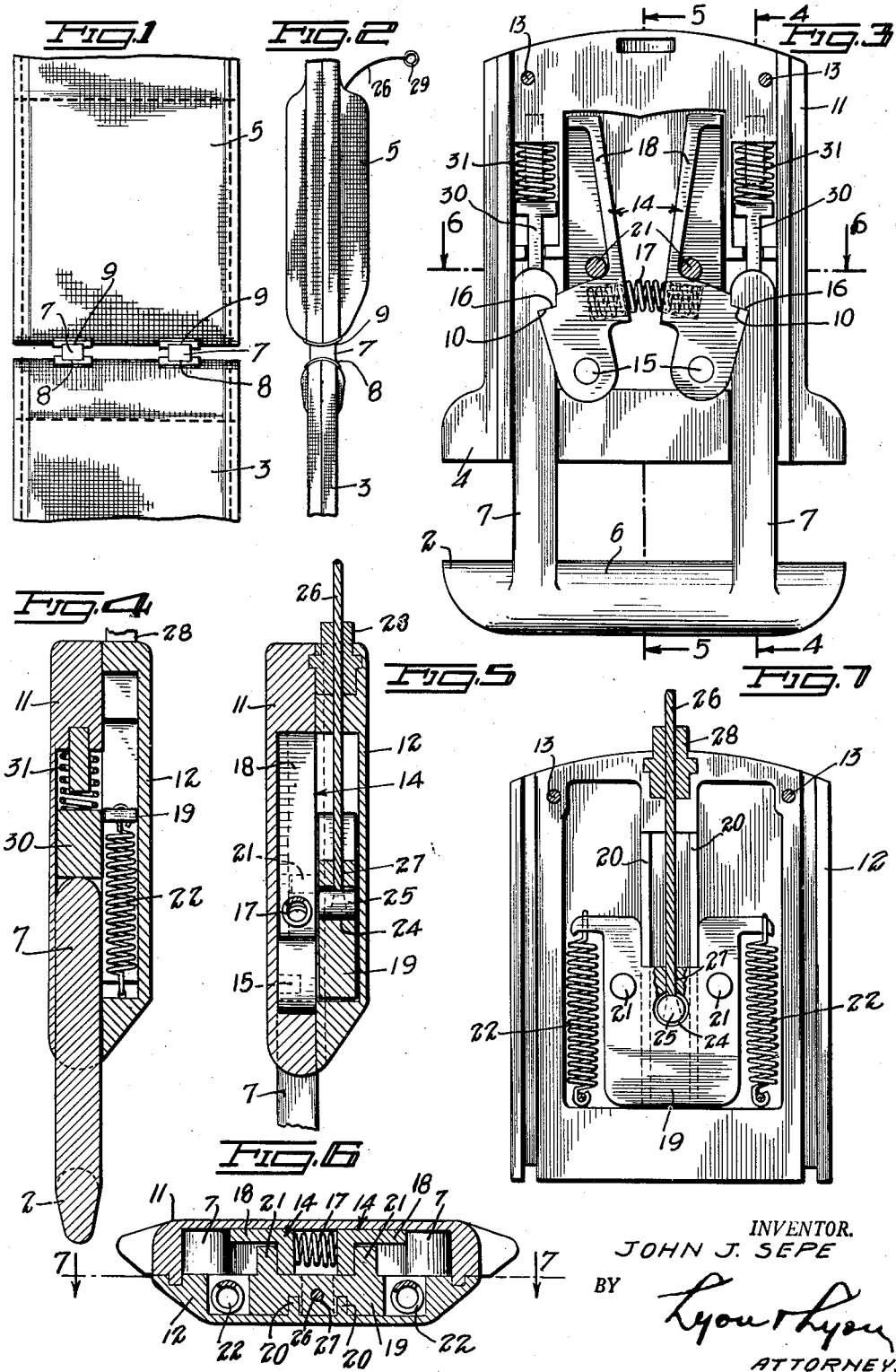

2,867,024

HARNESS RELEASE

John J. Sepe, Hollywood, Calif., asisgnor of one-half to John A. Gaylord, Pacific Palisades, Calif.

Application March 3, 1953, Serial No. 340,038

10 Claims. (Cl. 24—211)

This invention relates to a harness release and is particularly intended to provide a lock suitable for attaching a harness from a parachute to that of a wearer.

The wearer of a parachute has need of a device by which he may rapidly release the parachute on descent in order not to be injured by being dragged by the parachute. This release apparatus should be rapidly operable by the wearer using a single hand as frequently the wearer has one hand otherwise occupied or injured. Any exposed metal elements associated with the harness of the parachute, however, presents a hazard to the wearer.

There has heretofore been need for a parachute harness release which could be rapidly operated by a single hand of the operator and yet was so constructed as to prevent the exposure of any metal elements so that the wearer might be damaged thereby.

It is, therefore, the general object of the present invention to provide a parachute harness release which will not expose metal elements where they might damage the wearer of the parachute while at the same time the release is formed so as to be adequately protected against any accidental operation and still rapidly operable so that the parachute may be released quickly by the wearer utilizing only one hand for that purpose.

The harness release of the present invention comprises essentially two members, one of which is to be enclosed within a folded portion of the webbing of the harness strapped around the wearer of a parachute, and the other of which is to be enclosed within a folded portion of the webbing which extends from the wearer to the parachute. One of these two members is provided with two prongs which extend through openings of the fold of the webbing enclosing that member. The other member contains certain releasable locking devices for cooperating with said prongs and at the fold of the webbing enclosing said other member there are two holes for the entrance of said prongs. Each of the webbings may be reinforced around the openings so that the webbings are not weakened thereby.

In the attached position of the two members the folds of the harness sections holding the two members come together with the prongs from one member entering the opening of the other member thereby the entire releasable latch is enclosed within said webbing, except for a small release wire which might also be made of webbing.

In operation of the parachute harness release of the present invention there is therefore no metal parts exposed such as might cause injury to the wearer, and by the design of the release mechanism a release is provided which is protected against accidental release and yet instantly operable by one hand of the wearer to effect a release of the parachute from the wearer.

The parachute harness release of the present invention, together with further objects and advantages of the invention, will be more fully understood from the following description of a preferred example of the invention, the description being given in connection with the accompanying drawing, in which Figure 1 is a plan view of the harness release of the present invention;

Figure 2 is a side view;

Figure 3 is an enlarged plan view of the harness release lock with the webbing removed showing the parts in the locked position, some parts being shown in section;

Figure 4 is a section on the line 4—4 of Figure 3;

Figure 5 is a section on the line 5—5 of Figure 3;

Figure 6 is a section on the line 6—6 of Figure 3 of the lock containing member only; and Figure 7 is a section on the line 7—7 of Figure 6.

Referring to the drawings, the harness release lock of the present invention comprises a member 2 enclosed within a fold of a webbing 3 which, in practice, is part of the harness which is to be strapped about the wearer of the parachute. There is also provided a member 4 enclosed within the folds of a webbing 5 which, in practice, is attached to the parachute. The member 2 consists simply of the horizontal section 6 within the folds of the webbing and two parallel prongs 7 which are shown as extending through openings 8 of the webbing. In order that the webbing will not be weakened by the openings through which the prongs 7 extend, the webbing may be reinforced if desired around said openings. The member 4 has two openings 9 in the fold around which the webbing may be likewise reinforced, these openings being for the entrance of the prongs 7.

Now referring more particularly to Figures 3 to 7 of the drawings, the prongs 7 are each indicated as provided with a notch 10 on their inner face for cooperation with the locking members. The member 4 comprises a casing formed of the casing member 11 and casing member 12, which may be held together in any desired way, such as by setscrews 13. The casing member 11 is recessed from its inner side and the casing 12 is also recessed from its inner side for housing said locking and releasing members. The locking and releasing mechanism comprises two pivoted locking members 14 pivotally mounted by pins 15 set in the casing member 11. Each locking member 14 provides a shoulder 16, which in the locking position contacts the notch 10 of one of the prongs 7 for retaining the same. The locking members 14 are yieldingly urged into the locking position by the coil spring 17. Above the coil spring 17 each locking member 14 has a channel-shaped extension 18.

There is also provided a slide 19 mounted on tracks 20 forming part of the casing member 12. The locking members 14 are of a width to be retained within the opening of the casing member 11, whereas the width of slide 19 is such that it is mainly within the casing member 12 but it is provided with two extensions or pins 21 which enter the casing member 11 in the position to contact the side of the rib of the extension 18 of the locking member, and as it moves upward to pivot such members inwardly to a position where the prongs 7 are released from the locking members 14. The slide 19 is yieldingly retained in the lower part of the casing member 12 by the coil springs 22 attached at one end to the casing member 12 and at the other end to the slide 19. The slide 19 is also provided with a substantially circular opening 24 which receives a circular lock 25 to which is attached one end of a release wire 26 and an opening 27 is provided in the slide so that the release wire may extend circularly. The release wire extends through a fitting 28 in the casing member 11, and in practice has one end extending through a small opening in the webbing 5 where it may terminate in a ring 29 which may be grasped for unlocking the harness release.

There is also provided means for ejecting the prongs 7 from the member 5 when the locking members 14 are disengaged from the prongs 7 and for this purpose there are indicated the spring-pressed dogs 30 which, in the locked position, are engaged by the ends of the prongs 7 and forced upwardly against the compression spring 31 located in the recesses in the casing member 11.

In the use of the harness release of the present invention it will be seen that all of the metal parts of the harness release are protected by the webbing from contact with the wearer except the wire and ring. The harness of the wearer is attached to the harness of the parachute merely by inserting the prongs 7 into the openings in the webbing 5, the locking members 14 being free to pivot to allow the prongs to pass into locking position independent of any position of the locking slide 19. As they enter the opening the contacts are compressed by the compression springs 31 associated with the ejecting dogs 30, and as the notches 10 of the prongs 7 pass shoulder 16 of the locking members, the locking members snap into position to lock the prongs in place. Thereafter the harness of the parachute is fully attached to the harness of the wearer until operation of the release slide by pull on the release wire 26.

It requires but a single hand to operate the release wire as pivoting the locking members 14 inwardly disengages the shoulder 16 of such members from the notches 10 of the prongs 7. When this occurs the prongs 7 will be ejected from the locking position independent of any pull between the two elements 2 and 4 of the release so as to insure a rapid disengagement of the parachute from the wearer.

It will thus be seen that I have provided a harness release which is fully enclosed within the webbing and protected from damaging the wearer, and also capable of very rapid operation to disengage the parachute harness from that of the wearer.

While the particular form of the invention herein described is well adapted to carry out the objects of the invention, this invention is of the scope set forth in the appended claims.

I claim:

1. A parachute harness release comprising, a webbing having a fold, a release member enclosed within said webbing adjacent said fold, and having a prong extending through an opening in the webbing at said fold, a second webbing having a fold, a second release member enclosed within said webbing adjacent said fold, said latter webbing having an opening at the fold for the entrance of said prong, the second release member having a locking member movable into a locking engagement with said prong, and means for actuating said locking member into releasing position.

2. A parachute harness release comprising, a webbing having a fold, a release member enclosed within said webbing adjacent said fold, and having a prong extending through an opening in the webbing at said fold, a second webbing having a fold, a second release member enclosed within said webbing adjacent said fold, said latter webbing having an opening at the fold for the entrance of said prong, the second release member having a locking member movable into a locking engagement with said prong, means yieldingly urging the locking member into the locking position, and means for actuating the locking member into the releasing position.

3. A parachute harness release comprising, a webbing having a fold, a release member enclosed within said webbing adjacent said fold, and having a prong extending through an opening in the webbing at said fold, a second webbing having a fold, a second release member enclosed within said webbing adjacent said fold, said latter webbing having an opening at the fold for the entrance of said prong, the second release member having a locking member movable into a locking engagement with said prong, and said second release member having a spring-actuated dog contacted by said prong in the locking position and operated for separating the two release members on release of said locking member, and means for releasing said locking member.

4. A parachute harness release comprising, a webbing having a fold, a member enclosed within said fold and having a pair of prongs extending through openings in said fold, a second webbing, a second member enclosed in said latter webbing adjacent said fold, said second webbing having openings for the entrance of said prongs into said second member, said second member having a pair of movable locking members yieldingly urged into a locking position with said prongs, and means for yieldingly urging said locking members into a locking position.

5. A parachute harness release comprising, a webbing having a fold, a member enclosed within said fold and having a pair of prongs extending through openings in said fold, a second webbing, a second member enclosed in said latter webbing adjacent said fold, said second webbing having openings for the entrance of said prongs into said second member, said second member having a pair of movable locking members yieldingly urged into a locking position with said prongs, and ejecting means contacted by said prongs in the locking position and operated for yieldingly ejecting said prongs from the second member on the release of said locking member, and means for so releasing said locking member.

6. A parachute harness release comprising, a webbing having a fold, a member enclosed within said webbing at the fold and providing two extending prongs passing through openings in said webbing at the folds, a second member enclosed within a second folded webbing having a chamber for receiving the prongs on entrance into said second member through openings provided in the fold enclosing the same, said second member having a pair of locking members yieldingly urged into a locking position with said prongs, a slide yieldingly urged in one direction to permit said locking members to move into a locking position with said prongs, said slide being movable into a locking member releasing position, means yieldingly retaining said slide against movement into said releasing position, and a member for actuating said slide to the releasing position.

7. A parachute harness release comprising, a webbing having a fold, a member enclosed within said webbing at the fold and providing two extending prongs passing through openings in said webbing at the folds, a second member enclosed within a second folded webbing having a chamber for receiving the prongs on entrance into said second member through openings provided in the fold enclosing the same, said second member having a pair of locking members yieldingly urged into a locking position with said prongs, a slide yieldingly urged in one direction to permit said locking members to move into a locking position with respect to said prongs, said slide being movable into a locking member releasing position, means yieldingly retaining said slide against movement into the releasing position, a member for actuating said slide, and a pair of spring-pressed ejectors within said second member in position for yieldingly contacting the said prongs in the locking position.

8. A parachute harness release comprising, a folded webbing, a second folded webbing, a pair of members forming a releasing lock, one of said members included in each webbing in the fold, one of said members having prongs extending from the fold of the webbing into the other member through openings in the webbing enclosing said other member, said other member having a releasable lock for locking said prongs.

9. A parachute harness release comprising: a webbing having a fold, a member enclosed within said fold and having a pair of prongs extending through openings provided in said fold, a second webbing having a fold, a second member enclosed in said latter webbing adjacent said fold, said second webbing having openings for the entrance of said prongs into said second member, said second member having a pair of movable locking members yieldingly urged into locking position with said prongs, a slide contacting said locking members and movable from a locking position to a releasing position, the slide in the locking position permitting the movement of the locking members to the locking position and in the releasing position moving the locking members to a released position and means yieldingly urging said slide into the locking position and a member for operating said slide into a releasing position.

10. A parachute harness release comprising: a webbing having a fold, a member enclosed within said fold and having a pair of prongs extending through openings in said fold, a second webbing having a fold, a second member enclosed in said latter webbing adjacent said fold, said second webbing having openings for the entrance of said prongs into said second member, said second member having a pair of locking members yieldingly urged into a locking position within said prongs, a slide contacting said locking members and movable into a position permitting the movement of the locking members into the locking position, means yieldingly urging said slide into the locking position, said slide being movable into a position for releasing said locking members, a member for operating said slide into said releasing position and ejecting means in said second member yieldingly contacting said prongs for ejecting said prongs upon release of said locking members.

References Cited in the file of this patent

UNITED STATES PATENTS

| | | |
|---|---|---|
| 1,275,034 | Huxley | Aug. 6, 1918 |
| 2,164,447 | Clarke | July 4, 1939 |
| 2,522,790 | Johnston | Sept. 19, 1950 |

FOREIGN PATENTS

| | | |
|---|---|---|
| 40,503 | Austria | Jan. 10, 1910 |
| 557,868 | France | Aug. 17, 1923 |